June 21, 1927.                                          1,633,503
              T. H. SYMINGTON ET AL
          TRUCK BOLSTER WITH ABSORPTION MECHANISM
              Filed Oct. 7, 1926        2 Sheets-Sheet 1
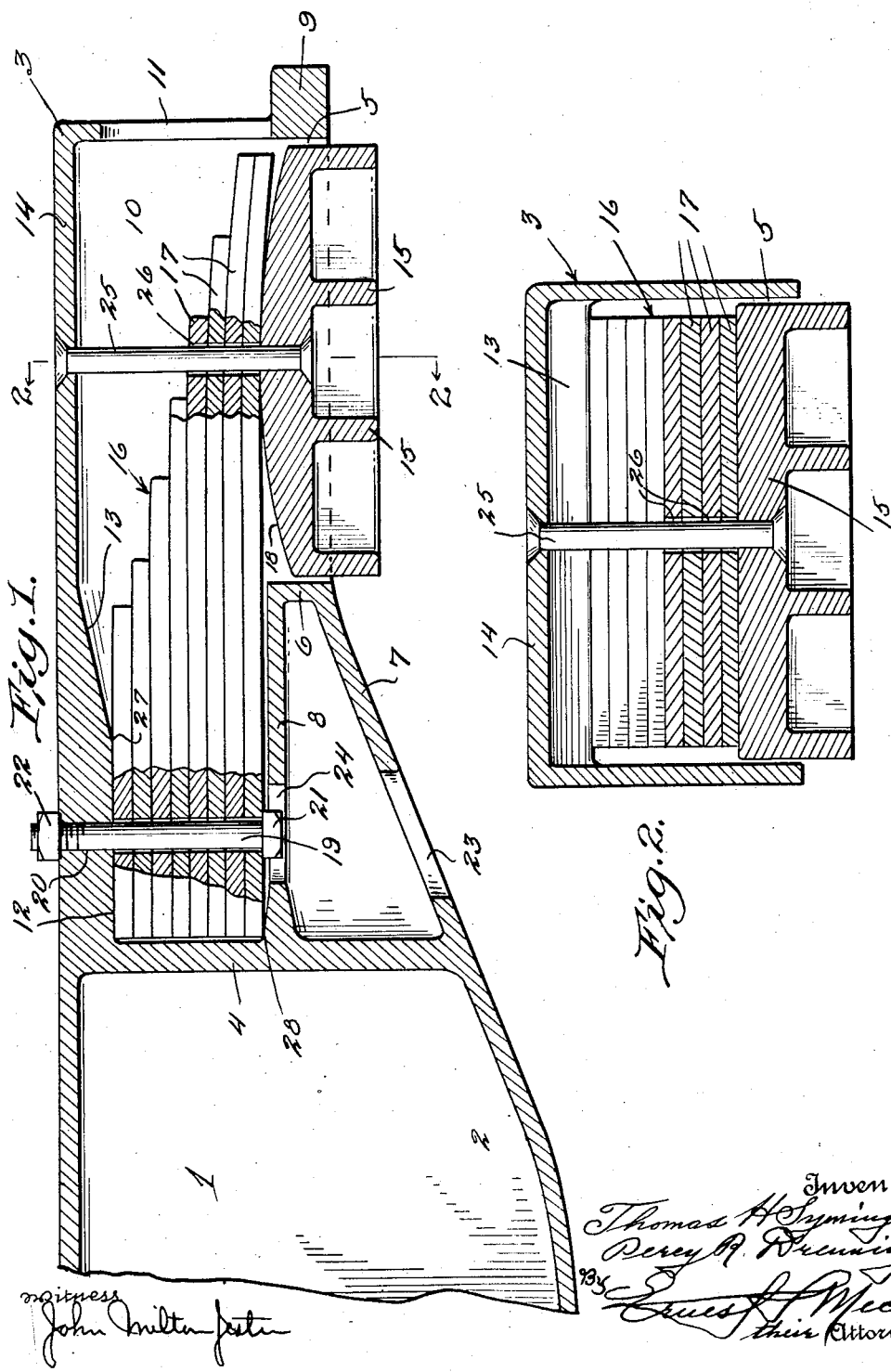

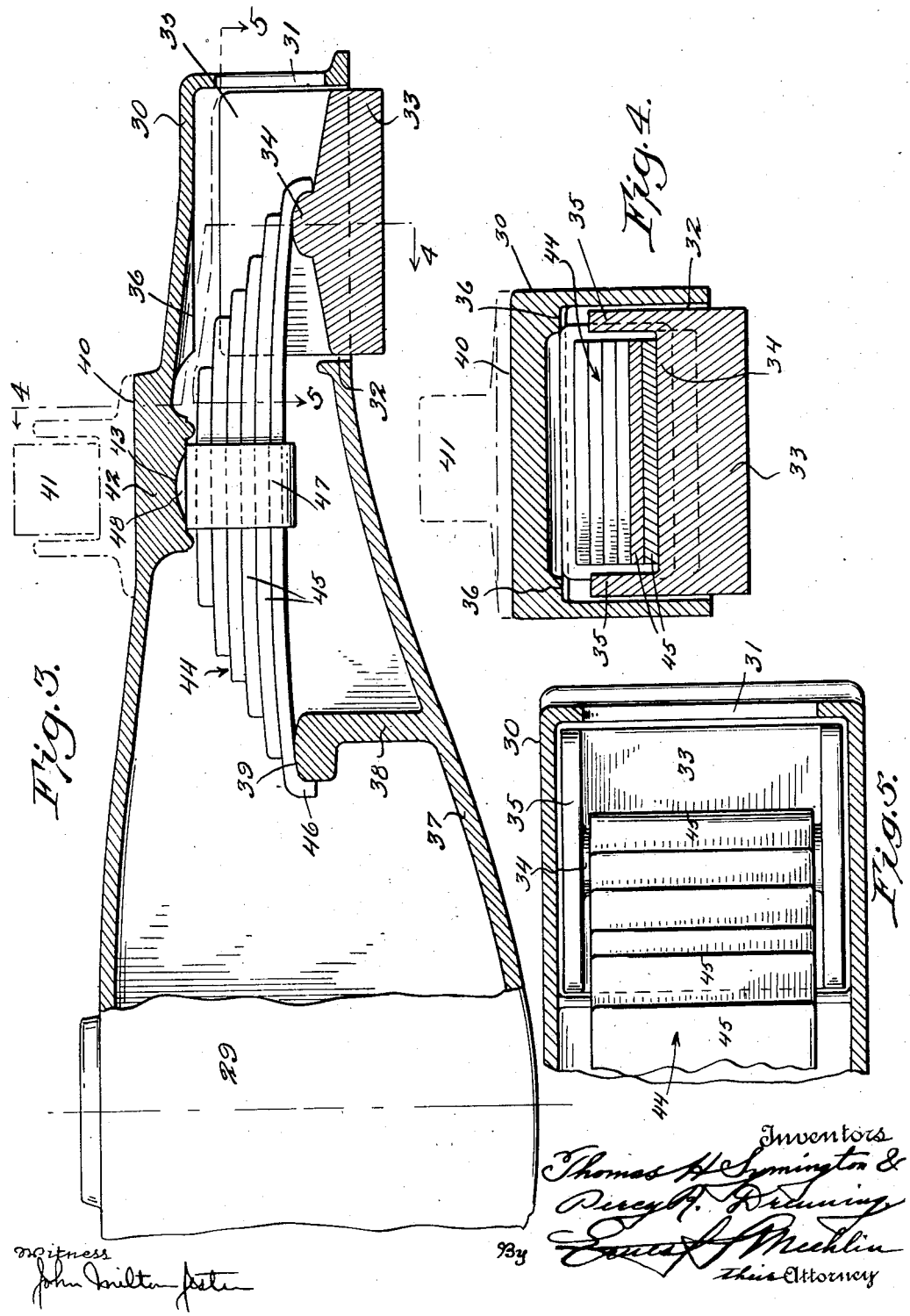

Patented June 21, 1927.

1,633,503

UNITED STATES PATENT OFFICE.

THOMAS H. SYMINGTON AND PERCY R. DRENNING, OF BALTIMORE, MARYLAND, ASSIGNORS, BY MESNE ASSIGNMENTS, TO T. H. SYMINGTON AND SON, INC., OF BALTIMORE, MARYLAND, A CORPORATION OF MARYLAND.

TRUCK BOLSTER WITH ABSORPTION MECHANISM.

Application filed October 7, 1926. Serial No. 140,185.

The invention relates to railway truck bolsters.

The principal object of the invention, generally stated, is to provide a railway truck bolster having absorption means acting in series with the usual bolster supporting springs for increasing the spring capacity and travel, by breaking up synchronization of the truck springs, reducing vertical jiggle and preventing the development of car roll or side sway.

The object of the invention, more specifically stated, is to provide a truck bolster equipped internally with cantilever or semi-elliptic spring means acting in series with the bolster supporting springs of the truck for increasing the resilience and reducing likelihood of overloads with the disadvantages attendant thereupon.

Another object of the invention is to provide a truck bolster embodying absorption means in the nature of a plurality of plate springs which may be curved or of the semi-elliptic type, or which may be flat, or substantially flat and arranged in cantilever form, the combination and disposition of the parts being such that the points of reaction will be at such locations as to insure maximum resilience and consequently a high degree of absorption effect, a certain amount of friction being also developed which will tend to retard any sudden movements, the cushioning action being consequently smooth and free from jiggle.

Another object is to provide a bolster containing cantilever, or semielliptic springs acting in series, with the bolster supporting springs, and giving increased vertical displacement to the bolster.

Another object is to provide a bolster containing cantilever, or semielliptic springs, anchored near the center of the bolster thus relieving the ends of the bolster proper of any vertical stress, with a resultant shortening of the beam length of the bolster housing, and permitting a reduction in its weight.

A further object of the invention is to provide auxiliary cushioning or absorption means located entirely within the truck bolster and consequently protected against damage and the deteriorating influences of the weather.

Still another object of the invention is to provide a truck bolster which is open at its ends to permit installation of the cushioning or absorption means therein in a simple manner.

Another specific object of the invention is to provide a truck bolster having novel means whereby the springs of whichever type are used may be effectually anchored in place, means being also provided whereby the relatively movable parts may be held against dislocation during transportation or handling so that the parts may be initially assembled where the device is made and be ready for mounting within a truck.

Yet another object is to provide a truck bolster of this character which may be used to replace one of the ordinary or conventional pattern without it being necessary to make any alterations in the construction of the side frames or other parts of the truck in which the device is to be used.

An additional object of the invention is to provide a truck bolster of this type and possessing the above mentioned characteristics and qualifications and which will at the same time be comparatively simple and inexpensive to manufacture and assemble, easy to install, positive in action, efficient and durable in service, and a general improvement in the art.

With the above and other objects and advantages in view, the invention preferably consists in the arrangement and combination of parts and detailed structural features to be hereinafter more fully described and claimed, and illustrated in the accompanying drawings in which:

Figure 1 is a longitudinal section through one end of a truck bolster constructed in accordance with the present invention, a cantilever type of spring being disclosed, Figure 2 is a cross sectional view taken on the line 2—2 of Figure 1, Figure 3 is a view similar to Figure 1 but illustrating absorption or cushioning springs of the semielliptic type, Figure 4 is a vertical cross sectional view taken on the line 4—4 of Figure 3, and Figure 5 is a horizontal sectional view taken on the line 5—5 of Figure 3.

Referring more particularly to the drawings and especially Figures 1 and 2 the numeral 1 designates the bolster as a whole and it is possible that this bolster be of conventional shape and construction in some or many respects in order that it may be used to replace one of ordinary pattern without involving alterations in the structure of the other parts of the truck in which it is used. In the present instance the bolster is represented as having an arched central portion 2 and a reduced end portion 3. Obviously, both ends must be the same and for this reason only one is illustrated as such is entirely sufficient for a proper understanding of the invention. At a point spaced from each end the bolster is preferably formed with a transverse wall 4 for reinforcement purposes. The bottom of the end portion 3 is formed with an opening 5, and adjacent the inner end of the opening the bolster is formed with an upstanding transverse web or wall portion 6 which merges into the bottom 7 and into a horizontal wall or partition 8 which in turn extends to and merges into the transverse wall 4. The bottom of each end of the bolster is preferably thickened at 9 for reinforcement purposes. Each end portion of the bolster is of hollow formation to provide a chamber 10 into which the opening 5 leads and each end is formed with an opening 11 to permit insertion of the spring means to be described. The top wall 12 adjacent the transverse wall 4 is preferably thickened, there being an inclined portion 13 extending from the bottom surface of the thickened portion 12 to the bottom surface of the top wall 14 of the chamber 10 for a purpose to be described.

Located within the opening 5 and vertically movably mounted is a follower 15 which may be of solid formation or ribbed as disclosed, and this follower member is adapted to rest upon the springs, not shown, commonly provided for supporting the bolster in the truck side frame. The absorption or cushioning means is here shown as comprising a cantilever spring designated as a whole by the numeral 16 and comprising a plurality of elongated plate or leaf springs 17 which may be of progressively decreasing lengths with the lowermost engaging the convex upper surface 18 of the follower. The entire group of springs is shown as located within the pocket or socket defined between the sides of the bolster, the wall 8 and the wall 12. In the present instance we have shown only a single bank of springs though it is quite apparent that a greater number may be provided if found desirable for any reason. While it is conceivable that any suitable means may be provided for securing the bank of springs in place, this means may conveniently consist of one or more bolts 19, one probably being sufficient, extending through registering holes in all the plate or leaf springs and through a hole 20 in the thick top wall 12 of the bolster. It is preferable that the head 21 of the bolt be located beneath the bank of springs and that a nut 22 be threaded onto the upper end of the bolt in engagement with the top of the bolster. To facilitate assembling the bottom 7 and wall 8 are preferably provided with alining openings 23 and 24, respectively, through which access may be had to the bolt or bolts, as the case may be.

It is of course conceivable that the follower 18 may simply bear against the underside of the bank or group of springs but it is really preferable to provide means permanently connecting the follower with the spring in order to prevent dislocation of the parts during transportation or handling at any time. This may be readily accomplished by providing a rivet 25, or its equivalent, passing through the follower 18, through suitable registering holes 26 in the springs and through the top of the bolster wall 14. When this rivet is in place it is clear that the follower will always remain associated with the springs. It is of course apparent that the presence of this rivet does not in any way interfere with the action.

In the operation, it will be seen that the cantilever spring assembly 16 acts in series with whatever truck springs are provided for supporting the bolster. The resilience of the cantilever springs added to that of the truck springs will greatly increase the spring capacity of the car equipped with the invention. All the individual leaves or plates 17 making up the spring 16 will of course be flexed, the longer ones flexing to a greater extent than the shorter ones as is a natural occurrence. The point 27 at the juncture of the inclined wall 13 with the top wall 12, and the point 28 where the inner lower corner of the cantilever spring assembly engages the juncture of the wall 8 with the wall 4 are the reaction points. Owing to the provision of the inclined wall 13 it is evident that there will be nothing to interfere with upward flexing of the cantilever springs as movement is permitted without interference caused by striking against the top of the bolster.

In the modification disclosed in Figures 3, 4 and 5, the bolster 29 may be of the same general contour as disclosed in Figure 1 or as is a common design. The bolster has an extension 30 at each end, the extension being of hollow formation and having its outer wall provided with an opening 31 through which may be inserted the spring means to be described. The bottom of each extension or end has an opening 32 therein within which is vertically movably mounted a follower 33 here shown as having its top surface provided with a central projection 34 preferably of curved shape. At its opposite sides the follower 33 is preferably formed with upstanding flanges 35 which are spaced slightly from the sides of the bolster and which act to guide the follower during its vertical movement so that "cocking" thereof will be prevented. The undersurface of the top of the bolster may also be formed with ledges 36 adapted to be engaged by the upper edges of the flanges 35 in case the spring means, to be described, goes solid as the result of an overload.

Formed upon and merging into the bottom 37 of the bolster is a vertical wall 38 having its upper edge preferably thickened and widened to define a seat 39 located in the same or substantially the same horizontal plane as the projection 34, at least when the parts are in normal position. The top of the bolster is provided with a seat 40 upon which may be mounted a side bearing 41 of any ordinary or preferred type, and below this point or area the top of the bolster is thickened, as at 42, for reinforcement purposes, this thickened portion having a concavity 43 therein.

The cushioning or absorption means is shown in this instance as comprising a bank or group 44 of elongated plate or leaf springs 45 here represented as of progressively decreasing length with the lowermost one resting upon the seat 39 and projection 34, the ends being bent downwardly as at 46 to prevent longitudinal shifting. Engaged upon the central portion of this spring assembly is a shackle 47 which preferably has a crowned or curved upper surface 48 fulcruming within the concavity 43. This shackle is shown as of loop or frame-like construction with the entire bank of springs passing therethrough.

In its main characteristics, this form will operate in substantially the same manner as the form above described, the principal difference being the employment of semielliptic springs as compared with those of the cantilever type. In this instance the points of engagement of the extension or projection 34 and seat 39 with the spring assembly and the point of engagement of the shackle with the top of the bolster constitute the reaction points. In this form of the invention, as in the other, the spring assembly 44 acts in series with whatever springs are provided for supporting the bolster with respect to the truck side frames so that the spring capacity of the truck is greatly increased. As mentioned above, in case of overload the flanges 35 will engage the ledges 36 to avoid overflexing of the plate or leaf springs with possible damage thereto. As the period of vibration of the spring assembly 44 is different from that of the truck springs synchronization of the latter is broken up so that there will be a positive check on any tendency of the car to develop roll or side sway. Furthermore, the difference in period of the springs combined with the useful friction developed between the leaves of the plate springs will, in both forms of the invention, operate to reduce if not entirely eliminate vertical jiggle, the movement being smoother or less jerky. It is really believed that the construction, operation and advantages will be readily apparent to one skilled in the art without further explanation though it might be mentioned in passing that retaining means may be provided in both forms for holding the follower permanently connected with the bolster or that such retaining means may be omitted in both instances if desired.

While we have shown and described preferred embodiments of the invention, it should be distinctly understood that the disclosure is merely for illustrative purposes only as the right is reserved to make all such changes in the details of construction and the arrangement and combination of parts as will not depart from the spirit of the invention or the scope of the claims hereunto appended.

Having thus described the invention, we claim:

1. A truck bolster provided at the bottom of each end with an opening, a follower mounted for vertical movement within each opening and adapted to seat upon bolster supporting springs located within a side frame, and a bank of elongated plate springs located within each end of the bolster and engaging the follower to constitute cushioning means acting in series with the truck springs, said plate springs extending longitudinally of the bolster.

2. A truck bolster provided at the bottom of each end with an opening, a follower mounted for vertical movement within each opening and adapted to seat upon bolster supporting springs located within a side frame, a bank of elongated plate springs located within each end of the bolster and engaging the follower to constitute cushioning means acting in series with the truck springs, said plate springs extending longitudinally of the bolster, and means for anchoring the plate springs against dislocation with respect to the bolster.

3. A truck bolster provided at the bottom of each end with an opening, a follower mounted for vertical movement within each opening and adapted to seat upon bolster supporting springs located within a side frame, a bank of elongated plate springs located within each end of the bolster and engaging the follower to constitute cushioning means acting in series with the truck springs, said plate springs extending longitudinally of the bolster, means for anchoring the plate springs against dislocation with respect to the bolster, and other means maintaining the plate springs against dislocation with respect to the followers.

4. A railway car truck bolster provided at the bottom of each end with an opening, a follower mounted for vertical movement within each opening, a bank of superposed plate springs enclosed within each end of the bolster and extending longitudinally thereof, and means anchoring the inner ends of the banks of springs within the bolster, the outer ends of the springs engaging upon the tops of the followers.

5. A railway car truck bolster having the bottom of each end formed with an opening, a follower mounted for vertical movement within each opening, a seat member within the bolster in spaced relation to each end thereof, and a bank of superposed leaf springs enclosed within each end of the bolster and extending longitudinally thereof, the inner ends of the banks of spring members engaging upon said seat members and their outer ends engaging upon the followers.

6. A railway car truck bolster provided in the bottom of each end with an opening, a vertically movable follower within each opening, and a bank of superposed plate springs mounted within each end of the bolster and extending longitudinally thereof and engaged upon the followers, the ends of the bolster having openings through which the springs may be inserted during assembling.

7. A railway car truck bolster having the bottom of each end formed with an opening, a vertically movable follower mounted within each opening, the bolster having a transverse wall spaced from each end and defining a seat, and a bank of superposed plate springs located within each end of the bolster in engagement with said seat and with the top of the follower, the banks of springs having reaction points at the seat and at the top of the bolster.

8. A railway car truck bolster having the bottom of each end formed with an opening a vertically movable follower mounted within each opening and adapted to seat upon truck springs, a bank of superposed plate springs arranged longitudinally within each end of the bolster, means anchoring one end of the springs and the other end of each bank of springs engaging upon the top of the adjacent follower.

In testimony whereof we affix our signatures.

THOMAS H. SYMINGTON.
PERCY R. DRENNING.